US009071163B2

(12) United States Patent
Ku et al.

(10) Patent No.: US 9,071,163 B2
(45) Date of Patent: Jun. 30, 2015

(54) HYBRID DC-TO-AC CONVERSION SYSTEM AND METHOD OF OPERATING THE SAME

(75) Inventors: Chen-Wei Ku, Taoyuan County (TW); Lei-Ming Lee, Taoyuan County (TW); Ho Huang, Taoyuan County (TW)

(73) Assignee: DELTA ELECTRONICS, INC. (TW)

( * ) Notice: Subject to any disclaimer, the term of this patent is extended or adjusted under 35 U.S.C. 154(b) by 428 days.

(21) Appl. No.: 13/610,297

(22) Filed: Sep. 11, 2012

(65) Prior Publication Data

US 2014/0049996 A1 Feb. 20, 2014

(30) Foreign Application Priority Data

Aug. 16, 2012 (TW) .............................. 101129760 A

(51) Int. Cl.
*H02M 7/48* (2007.01)
*H02M 7/5388* (2007.01)

(52) U.S. Cl.
CPC .............. *H02M 7/48* (2013.01); *H02M 7/5388* (2013.01)

(58) Field of Classification Search
CPC .................................................... H02M 7/5388
USPC .............. 363/71, 78, 79, 95, 97, 98, 131–134
See application file for complete search history.

(56) References Cited

U.S. PATENT DOCUMENTS

| 7,586,768 B2 * | 9/2009 | Yoshimoto ....................... 363/71 |
| 7,719,138 B2 * | 5/2010 | Gallegos-Lopez et al. ..... 307/43 |
| 7,948,118 B2 * | 5/2011 | Chambon ........................ 307/66 |
| 2005/0174817 A1 | 8/2005 | Schmidt et al. |
| 2008/0238200 A1 | 10/2008 | Yoshimoto et al. |

FOREIGN PATENT DOCUMENTS

| DE | 102006010694 | 9/2007 |
| JP | 59-96876 | 6/1984 |
| JP | 60-13479 | 1/1985 |
| JP | 2010119257 | 5/2010 |
| WO | 2012069646 | 5/2012 |

OTHER PUBLICATIONS

Office Action dated Feb. 4, 2014 from corresponding application No. JP 2013-000646.
European Search Report dated Nov. 25, 2013 from corresponding application No. EP 12007423.2.

* cited by examiner

*Primary Examiner* — Gary L Laxton
*Assistant Examiner* — Afework Demisse
(74) *Attorney, Agent, or Firm* — Lowe Hauptman & Ham, LLP

(57) ABSTRACT

A hybrid DC-to-AC conversion system includes a first DC input voltage, a second DC input voltage, a power conversion apparatus, and a comparison unit. The power conversion apparatus is connected in parallel to the first DC input voltage and the second DC input voltage to convert the first DC input voltage or the second DC input voltage into an AC output voltage. The comparison unit receives the AC output voltage and an external reference voltage. The comparison unit outputs a control signal to make the first DC input voltage supply a load when an absolute value of the AC output voltage is less than or equal to the external reference voltage, whereas the comparison unit outputs the control signal to make the second DC input voltage supply the load when the absolute value of the AC output voltage is greater than the external reference voltage.

20 Claims, 11 Drawing Sheets

HYBRID DC-TO-AC CONVERSION SYSTEM AND METHOD OF OPERATING THE SAME

This application is based on and claims the benefit of Taiwan Application No. 101129760 filed Aug. 16, 2012 the entire disclosure of which is incorporated by reference herein.

BACKGROUND

1. Technical Field

The present disclosure relates generally to a hybrid DC-to-AC conversion system and a method of operating the same, and more particularly to a hybrid DC-to-AC conversion system and a method of operating the same to supply a load by different-level DC input voltages.

2. Description of Related Art

Reference is made to FIG. 1 which is a circuit diagram of a prior art two-stage inverter. The two-stage inverter includes a DC-to-DC converter 10A and a full-bridge DC-to-AC converter 20A. The full-bridge DC-to-AC converter 20A is composed of four power switches S1,S2,S3,S4 and diodes connected in parallel to the corresponding power switches. The full-bridge DC-to-AC converter 20A is connected in parallel to the DC-to-DC converter 10A and a DC capacitor C1 is connected between the DC-to-DC converter 10A and the full-bridge DC-to-AC converter 20A to provide buffering of the electric energy. The DC-to-DC converter 10A receives a DC voltage Vdc and the DC voltage Vdc is converted into a capacitance voltage Vc1 by the DC-to-DC converter 10A. Afterward, the full-bridge DC-to-AC converter 20A converts the capacitance voltage Vc1 into a sinusoidal AC voltage with adjustable amplitude and frequency. Finally, the sinusoidal AC voltage is filtered by a filter circuit 30A, which is composed of a first filter inductor L1, a second filter inductor L2, and a filter capacitor Co, to produce an output voltage to supply a load 40A. Note that in order to stabilize the AC output voltage of the two-stage inverter, the capacitance voltage Vc1 has to be greater than an absolute value of the maximum output voltage of supplying the load 40A. Accordingly, the DC-to-DC converter 10A is usually the boost structure to meet the required power for supplying the load 40A, thus stabilizing the output voltage.

However, switching losses of the power switches S1,S2, S3,S4 are proportional to the voltage across the corresponding power switches S1,S2,S3,S4. In order to meet the required power for supplying the load 40A under the condition of that the capacitance voltage Vc1 is greater than the absolute value of the maximum output voltage, more switching losses are generated from the power switches S1,S2,S3,S4. In addition, in order to stabilize the output voltage so that the inverter is the two-stage structure including the DC-to-DC converter 10A and the full-bridge DC-to-AC converter 20A, thus significantly reducing the conversion efficiency.

Accordingly, it is desirable to provide a hybrid DC-to-AC conversion system and a method of operating the same to supply a load by different-level DC input voltages to reduce switching losses of power switches, thus increasing conversion efficiency of the hybrid DC-to-AC conversion system.

SUMMARY

An object of the invention is to provide a hybrid DC-to-AC conversion system to solve the above-mentioned problems. Accordingly, the hybrid DC-to-AC conversion system includes a first DC input voltage, a second DC input voltage, a power conversion apparatus, and a comparison unit. The second DC input voltage is greater than the first DC input voltage. The power conversion apparatus is connected in parallel to the first DC input voltage and the second DC input voltage and is configured to convert the first DC input voltage or the second DC input voltage into an AC output voltage to supply a load. The comparison unit is configured to receive the AC output voltage and an external reference voltage, wherein the comparison unit is configured to output a control signal to control the power conversion apparatus converting the first DC input voltage into the AC output voltage when an absolute value of the AC output voltage is less than or equal to the external reference voltage; whereas the comparison unit is configured to output the control signal to control the power conversion apparatus converting the second DC input voltage into the AC output voltage when the absolute value of the AC output voltage is greater than the external reference voltage.

Another object of the invention is to provide a method of operating a hybrid DC-to-AC conversion system to solve the above-mentioned problems. Accordingly, the method includes the following steps: (a) providing a first DC input voltage and a second DC input voltage, wherein the second DC input voltage is greater than the first DC input voltage; (b) providing a power conversion apparatus, wherein the power conversion apparatus is connected in parallel to the first DC input voltage and the second DC input voltage and configured to convert the first DC input voltage or the second DC input voltage into an AC output voltage to supply a load; (c) providing a comparison unit, wherein the comparison unit is configured to receive the AC output voltage and an external reference voltage; (d) outputting a control signal by the comparison unit to control the power conversion apparatus converting the first DC input voltage into the AC output voltage when an absolute value of the AC output voltage is less than or equal to the external reference voltage; and (e) outputting the control signal by the comparison unit to control the power conversion apparatus converting the second DC input voltage into the AC output voltage when the absolute value of the AC output voltage is greater than the external reference voltage.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF DRAWINGS

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION

Figure 1:
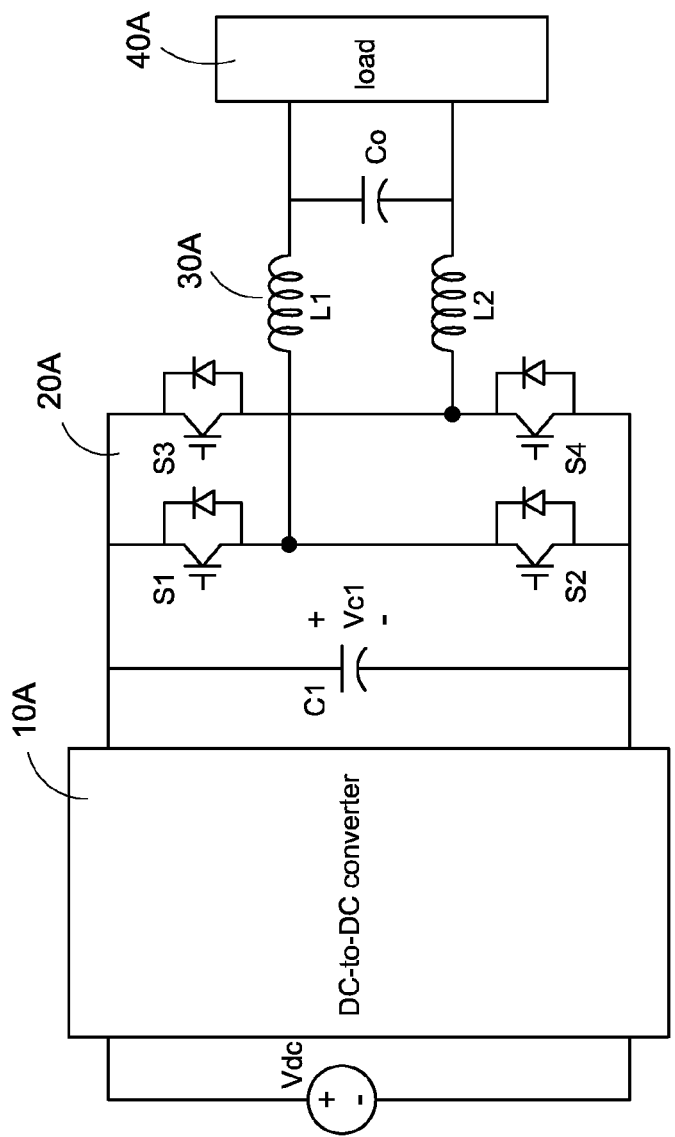
FIG. 1 is a circuit diagram of a prior art two-stage inverter.

Reference will now be made to the drawing figures to describe the present disclosure in detail.

Figure 3A:
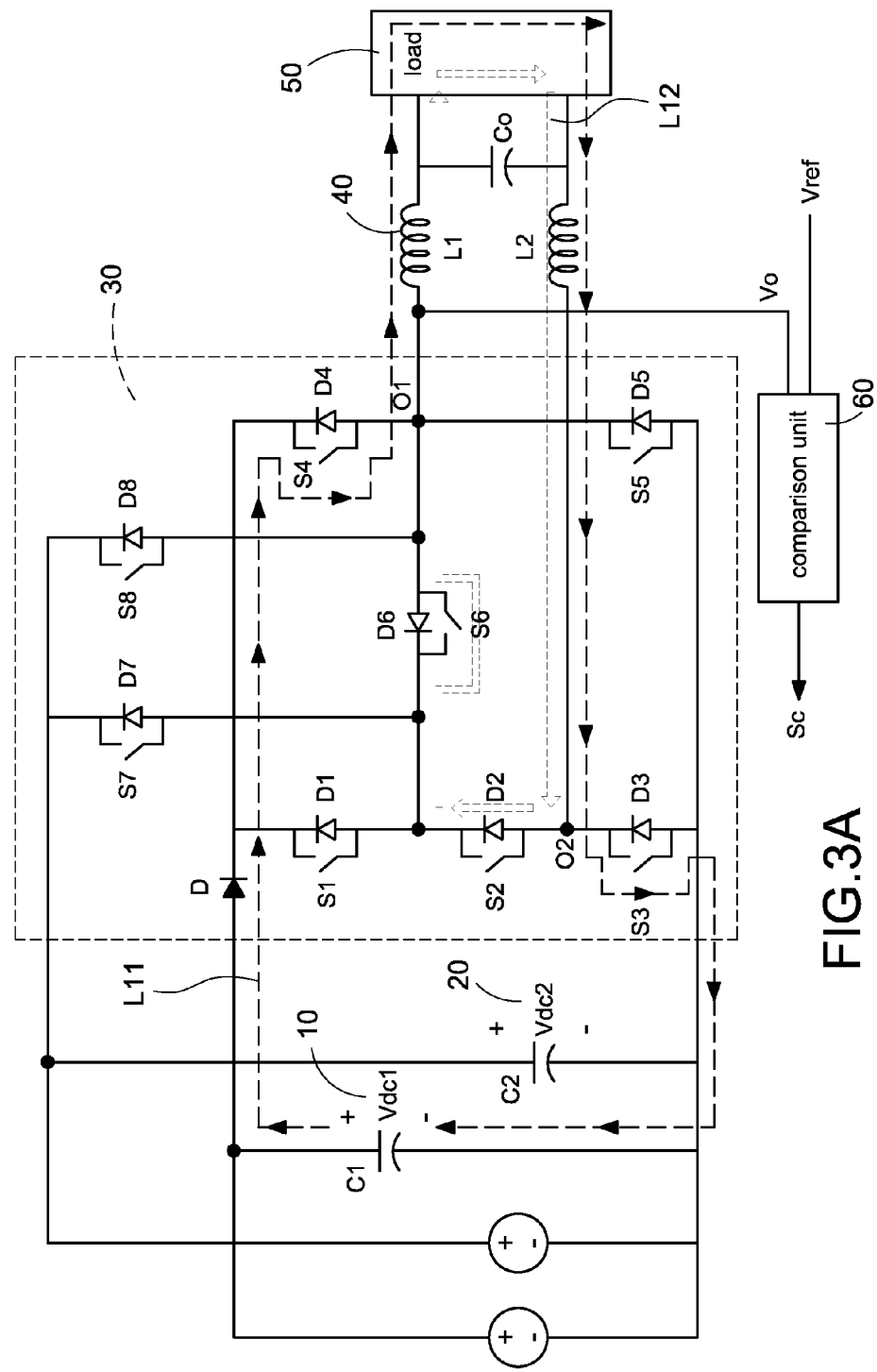
FIG. 3A is a circuit diagram of supplying power from a first DC input voltage of a hybrid DC-to-AC conversion system under a positive AC output voltage according to a first embodiment of the present disclosure.

The present invention disclosures a hybrid DC-to-AC conversion system. Reference is made to FIG. 3A which is a circuit diagram of supplying power from a first DC input voltage of a hybrid DC-to-AC conversion system under a positive AC output voltage according to a first embodiment of the present disclosure. The hybrid DC-to-AC conversion system includes a first DC input voltage 10, a second DC input voltage 20, a power conversion apparatus 30, and a comparison unit 60. In particular, the second DC input voltage 20 is greater than the first DC input voltage 10. In addition, the positive terminal and the negative terminal of the first DC input voltage 10 are respectively connected to two terminals of a first DC capacitor C1 to maintain a magnitude of the first DC input voltage 10. Also, the positive terminal and the negative terminal of the second DC input voltage 20 are respectively connected to two terminals of a second DC capacitor C2 to maintain a magnitude of the second DC input voltage 20. The power conversion apparatus 30 is connected in parallel to the first DC input voltage 10 and the second DC input voltage 20. The power conversion apparatus 30 is provided to convert the first DC input voltage 10 or the second DC input voltage 20 into an AC output voltage to supply a load 50. The power conversion apparatus 30 has a first power switch S1 and a first diode D1 connected in parallel to the first power switch S1, a second power switch S2 and a second diode D2 connected in parallel to the second power switch S2, a third power switch S3 and a third diode D3 connected in parallel to the third power switch S3, a fourth power switch S4 and a fourth diode D4 connected in parallel to the fourth power switch S4, a fifth power switch S5 and a fifth diode D5 connected in parallel to the fifth power switch S5, a sixth power switch S6 and a sixth diode D6 connected in parallel to the sixth power switch S6, a seventh power switch S7 and a seventh diode D7 connected in parallel to the seventh power switch S7, an eighth power switch S8 and an eighth diode D8 connected in parallel to the eighth power switch S8, and a diode D.

As shown in FIG. 3A, the third power switch S3 is connected in series to the second power switch S2 and the second power switch S2 is connected in series to the first power switch S1 to form a first path. Also, a second output terminal O2 is formed at a common node of the second power switch S2 and the third power switch S3. The fifth power switch S5 is connected in series to the fourth power switch S4. An anode of the fifth diode D5 is connected to an anode of the third diode D3 and then is connected to a negative terminal of the first DC input voltage 10 and a negative terminal of the second DC input voltage 20. The sixth power switch S6 is connected between an anode of the first diode D1 and an anode of the fourth diode D4. A first output terminal O1 is formed at a common node of the sixth power switch S6 and the fourth power switch S4. In particular, an AC output voltage Vo is outputted from the first output terminal O1 and the second output terminal O2. An anode of the seventh diode D7 is connected to a cathode of the sixth diode D6. The seventh power switch S7 is connected in series to the second power switch S2 and the second power switch S2 is connected in series to the third power switch S3 to form a second path. Also, the second path is connected in parallel to the second DC input voltage 20. An anode of the eighth diode D8 is connected to an anode of the sixth diode D6. A cathode of the eighth diode D8 is connected to a cathode of the seventh diode D7 and then is connected to a positive terminal of the second DC input voltage 20. A cathode of the diode D is connected to a cathode of the first diode D1 and a cathode of the fourth diode D4 and an anode of the diode D is connected to a positive terminal of the first DC input voltage 10. The first path is connected in parallel to the first DC input voltage 10 via the diode D. The power conversion apparatus 30 is provided to convert the first DC input voltage 10 and the second DC input voltage 20 to supply a rear-end load 50.

The comparison unit 60 receives the AC output voltage Vo and an external reference voltage Vref. The comparison unit 60 outputs a control signal Sc to control the power conversion apparatus 30 converting the first DC input voltage 10 into the AC output voltage Vo to supply the load 50 when an absolute value of the AC output voltage Vo is less than or equal to the external reference voltage Vref. On the other hand, the comparison unit 60 outputs the control signal Sc to control the power conversion apparatus 30 converting the second DC input voltage 20 into the AC output voltage Vo to supply the load 50 when the absolute value of the AC output voltage Vo is greater than the external reference voltage Vref.

Figure 2:
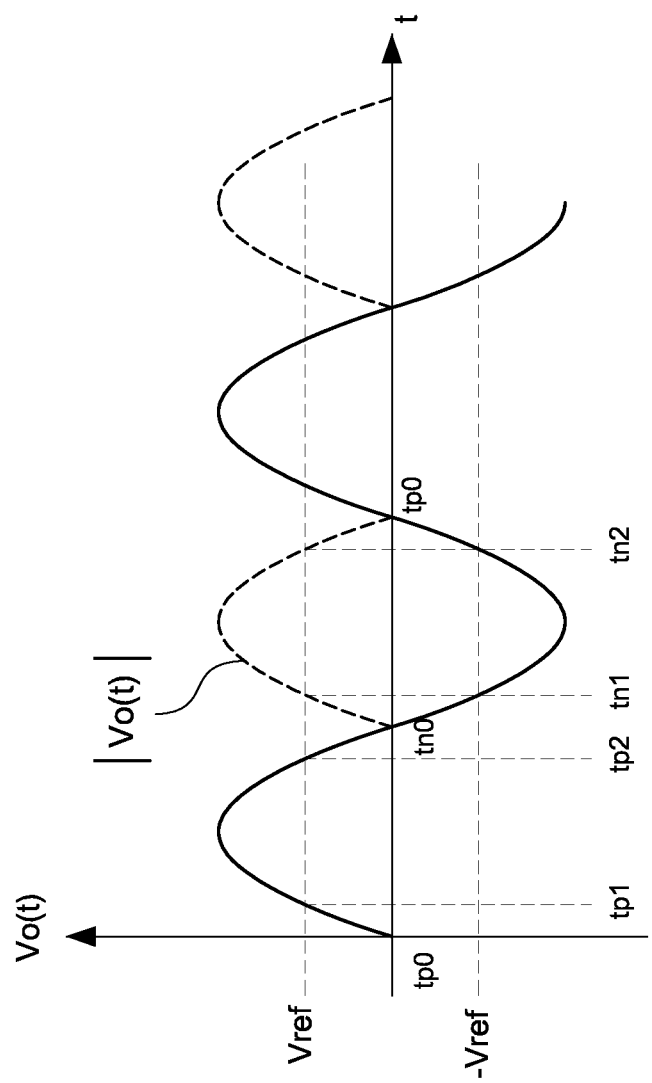
FIG. 2 is a schematic view of comparing an AC output voltage to an external reference voltage according to the present disclosure.

As for the comparison between the absolute value of the AC output voltage Vo and the external reference voltage Vref is made to FIG. 2. The AC output voltage Vo outputted from the power conversion apparatus 30 is a sinusoidal AC voltage. In FIG. 2, a waveform of the absolute value (|Vo|) of the AC output voltage Vo is shown as the dotted line. In particular, the absolute value of the AC output voltage Vo is less than or equal to the external reference voltage Vref that means the AC output voltage Vo is less than or equal to the external reference voltage Vref when the sinusoidal AC output voltage Vo is the positive half cycle, whereas the AC output voltage Vo is greater than or equal to the negative value of the external reference voltage Vref when the sinusoidal AC output voltage Vo is the negative half cycle. Similarly, the absolute value of the AC output voltage Vo is greater than the external reference voltage Vref that means the AC output voltage Vo is greater than the external reference voltage Vref when the sinusoidal AC output voltage Vo is the positive half cycle, whereas the AC output voltage Vo is less than the negative value of the external reference voltage Vref when the sinusoidal AC output voltage Vo is the negative half cycle. As shown in FIG. 2, during a complete period of the AC output voltage Vo, the following time intervals indicate that the absolute value of the AC output voltage Vo is less than or equal to the external reference voltage Vref: from a time point tp0 to a time point tp1, from a time point tp2 to a time point tn0, from the time point tn0 to a time point tn1, and from a time point tn2 to the time point tp0. In addition, the following time intervals indicate that the absolute value of the AC output voltage Vo is greater than the external reference voltage Vref: from the time point tp1 to the time point tp2 and the time point tn1 to the time point tn2. Especially, the external reference voltage Vref is adjustable according to actual use needs to the practical operation demands.

Accordingly, after comparing the AC output voltage Vo to the external reference voltage Vref, the smaller-level first DC input voltage 10 is provided to drive the power switches of the power conversion apparatus 30, thus reducing switching losses generated from the power switches when the required power of supplying the load 50 is smaller, whereas the greater-level second DC input voltage 20 is provided to drive the power switches of the power conversion apparatus 30 when the required power of supplying the load 50 is greater. That is, the first DC input voltage 10 and the second DC input voltage 20 are determined to drive the power switches depending on the required power of supplying the load 50, thus significantly increasing the conversion efficiency.

In addition, the hybrid DC-to-AC conversion system further includes a filter 40. The filter 40 is connected between the first output terminal O1, the second output terminal O2, and the load 50. Also, the filter has a first inductor L1, a second inductor L2, and a capacitor Co.

Reference is made to FIG. 3A again, the first DC input voltage 10 is provided to supply the load 50 when the absolute value of the AC output voltage Vo is less than or equal to the external reference voltage Vref and the first inductor L1 and the second inductor L2 of the filter 40 provide energy-storing operations. Correspondingly, a current loop L11 indicates that the energy-storing operation of the power conversion apparatus 30. On the other hand, the first inductor L1 and the second inductor L2 are provided to supply the load 50 by stored energy in the first inductor L1 and the second inductor L2 when the absolute value of the AC output voltage Vo is less than or equal to the external reference voltage Vref and the first inductor L1 and the second inductor L2 of the filter 40 provide energy-releasing operations. Correspondingly, a current loop L12 indicates that the energy-releasing operation of the power conversion apparatus 30. Accordingly, the first DC input voltage 10 is provided to supply the load 50 through a current loop sequentially formed by the first DC input voltage 10, the diode D, the fourth power switch S4, the first inductor L1, the load 50, the second inductor L2, the third power switch S3, and finally return to the first DC input voltage 10 (as the current loop L11 is shown) when the AC output voltage Vo is positive. In addition, the first inductor L1 and the second inductor L2 are provided to supply the load 50 by stored energy in the first inductor L1 and the second inductor L2 through a current loop sequentially formed by the first inductor L1, the load 50, the second inductor L2, the second diode D2, the sixth power switch S6, and finally return to the first inductor L1 (as the current loop L12 is shown) when the AC output voltage Vo is positive.

Figure 3B:
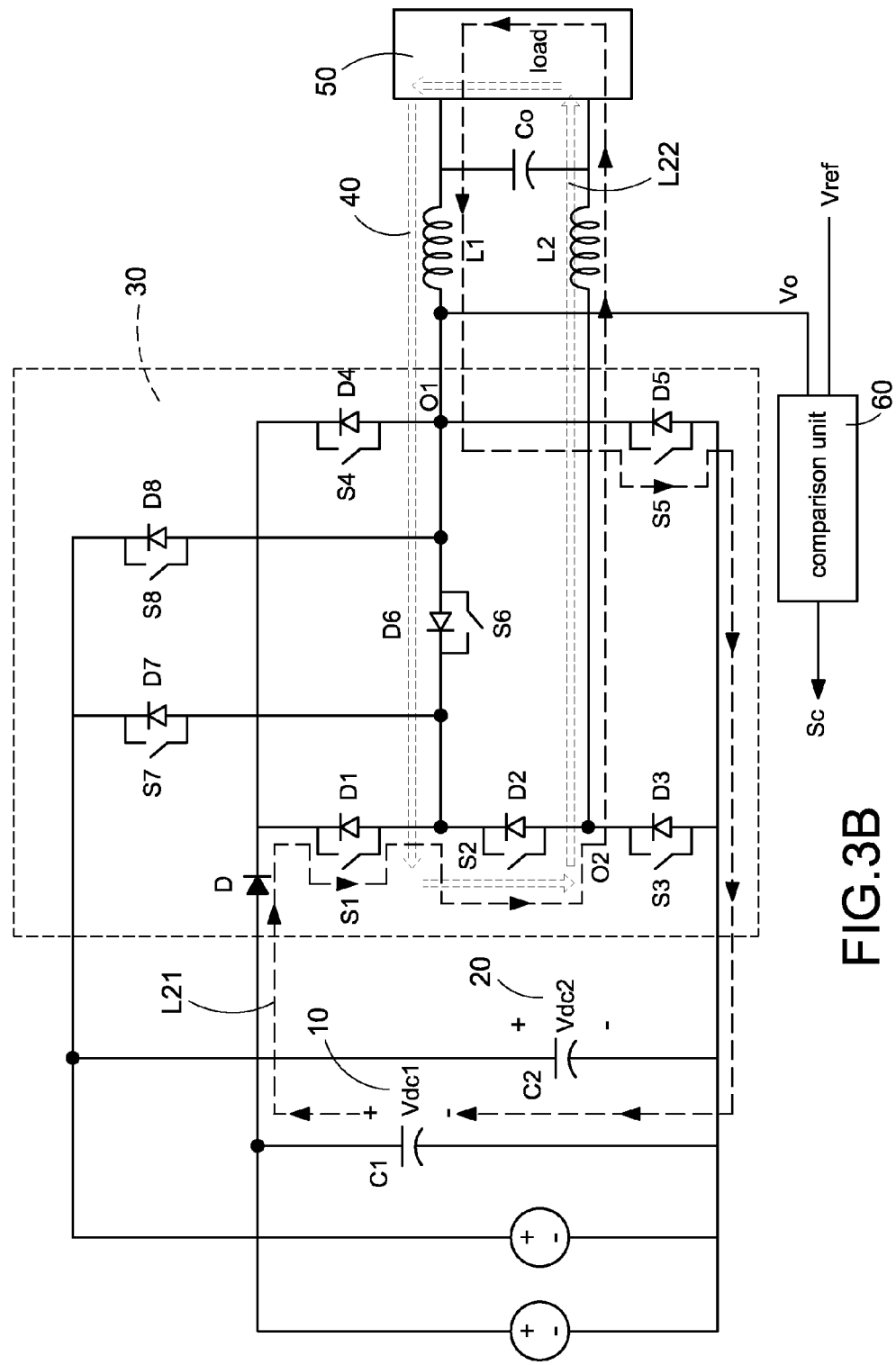
FIG. 3B is a circuit diagram of supplying power from the first DC input voltage of the hybrid DC-to-AC conversion system under a negative AC output voltage according to the first embodiment of the present disclosure.

Reference is made to FIG. 3B which is a circuit diagram of supplying power from the first DC input voltage of the hybrid DC-to-AC conversion system under a negative AC output voltage according to the first embodiment of the present disclosure. The first DC input voltage 10 is provided to supply the load 50 when the absolute value of the AC output voltage Vo is less than or equal to the external reference voltage Vref and the first inductor L1 and the second inductor L2 of the filter 40 provide energy-storing operations. Correspondingly, a current loop L21 indicates that the energy-storing operation of the power conversion apparatus 30. On the other hand, the first inductor L1 and the second inductor L2 are provided to supply the load 50 by stored energy in the first inductor L1 and the second inductor L2 when the absolute value of the AC output voltage Vo is less than or equal to the external reference voltage Vref and the first inductor L1 and the second inductor L2 of the filter 40 provide energy-releasing operations. Correspondingly, a current loop L22 indicates that the energy-releasing operation of the power conversion apparatus 30. Accordingly, the first DC input voltage 10 is provided to supply the load 50 through a current loop sequentially formed by the first DC input voltage 10, the diode D, the first power switch S1, the second power switch S2, the second inductor L2, the load 50, the first inductor L1, the fifth power switch S5, and finally return to the first DC input voltage 10 (as the current loop L21 is shown) when the AC output voltage Vo is negative. In addition, the first inductor L1 and the second inductor L2 are provided to supply the load 50 by stored energy in the first inductor L1 and the second inductor L2 through a current loop sequentially formed by the first inductor L1, the sixth diode D6, the second power switch S2, the second inductor L2, the load 50, and finally return to the first inductor L1 (as the current loop L22 is shown) when the AC output voltage Vo is negative.

Figure 4A:
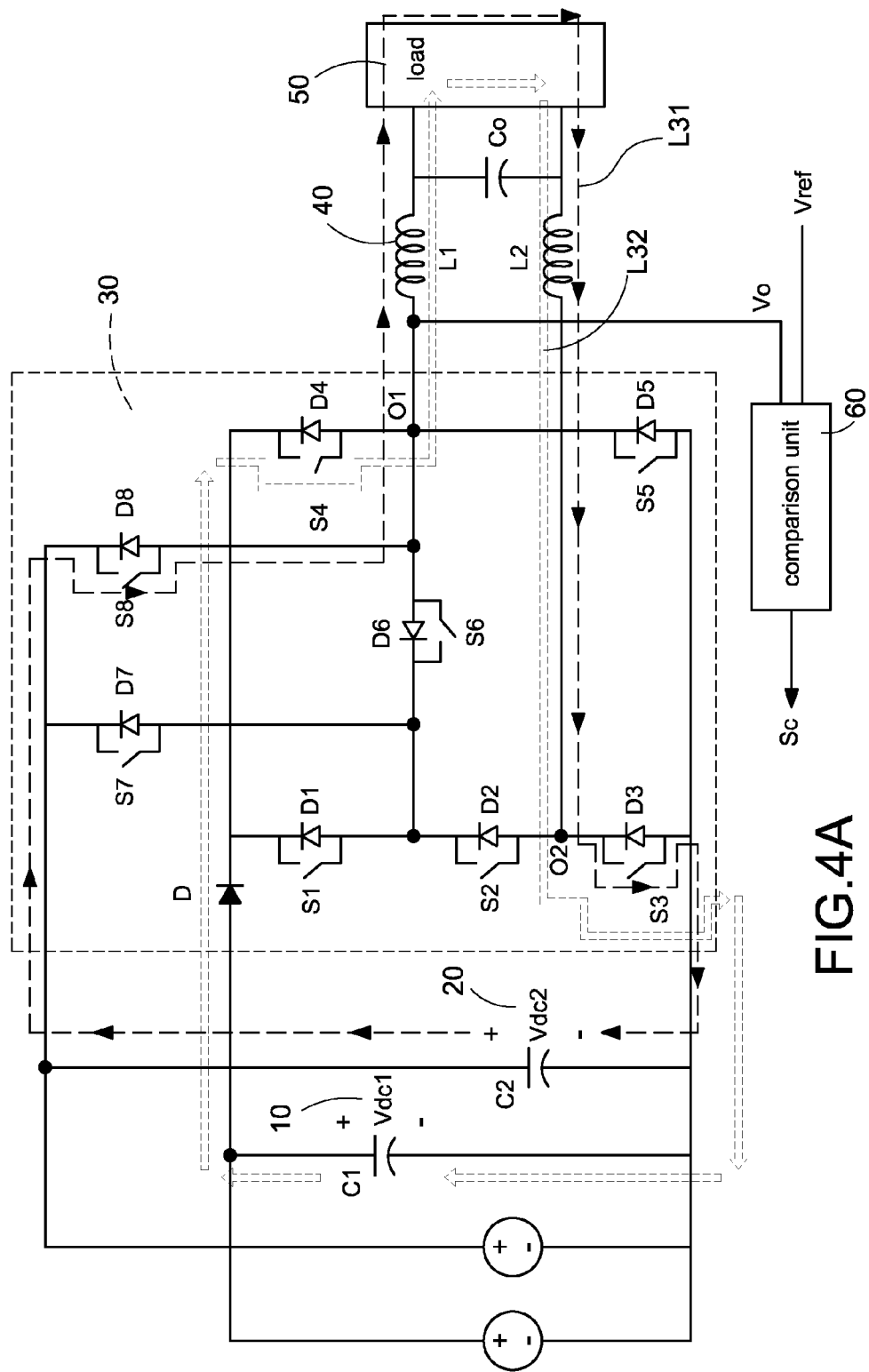
FIG. 4A is a circuit diagram of supplying power from a second DC input voltage of the hybrid DC-to-AC conversion system under a positive AC output voltage according to the first embodiment of the present disclosure.

Reference is made to FIG. 4A which is a circuit diagram of supplying power from a second DC input voltage of the hybrid DC-to-AC conversion system under a positive AC output voltage according to the first embodiment of the present disclosure. The second DC input voltage 20 is provided to supply the load 50 when the absolute value of the AC output voltage Vo is greater than the external reference voltage Vref and the first inductor L1 and the second inductor L2 of the filter 40 provide energy-storing operations. Correspondingly, a current loop L31 indicates that the energy-storing operation of the power conversion apparatus 30. On the other hand, the first inductor L1 and the second inductor L2 are provided to supply the load 50 by stored energy in the first inductor L1 and the second inductor L2 when the absolute value of the AC output voltage Vo is greater than the external reference voltage Vref and the first inductor L1 and the second inductor L2 of the filter 40 provide energy-releasing operations. Correspondingly, a current loop L32 indicates that the energy-releasing operation of the power conversion apparatus 30. Accordingly, the first DC input voltage 10 is provided to supply the load 50 through a current loop sequentially formed by the second DC input voltage 20, the eighth power switch S8, the first inductor L1, the load 50, the second inductor L2, the third power switch S3, and finally return to the second DC input voltage 20 (as the current loop L31 is shown) when the AC output voltage Vo is positive. In addition, the first inductor L1 and the second inductor L2 are provided to supply the load 50 by stored energy in the first inductor L1 and the second inductor L2 through a current loop sequentially formed by the first inductor L1, the load 50, the second inductor L2, the third power switch S3, the diode D, the fourth power switch S4, and finally return to the first inductor L1 (as the current loop L32 is shown) when the AC output voltage Vo is positive.

Figure 4B:
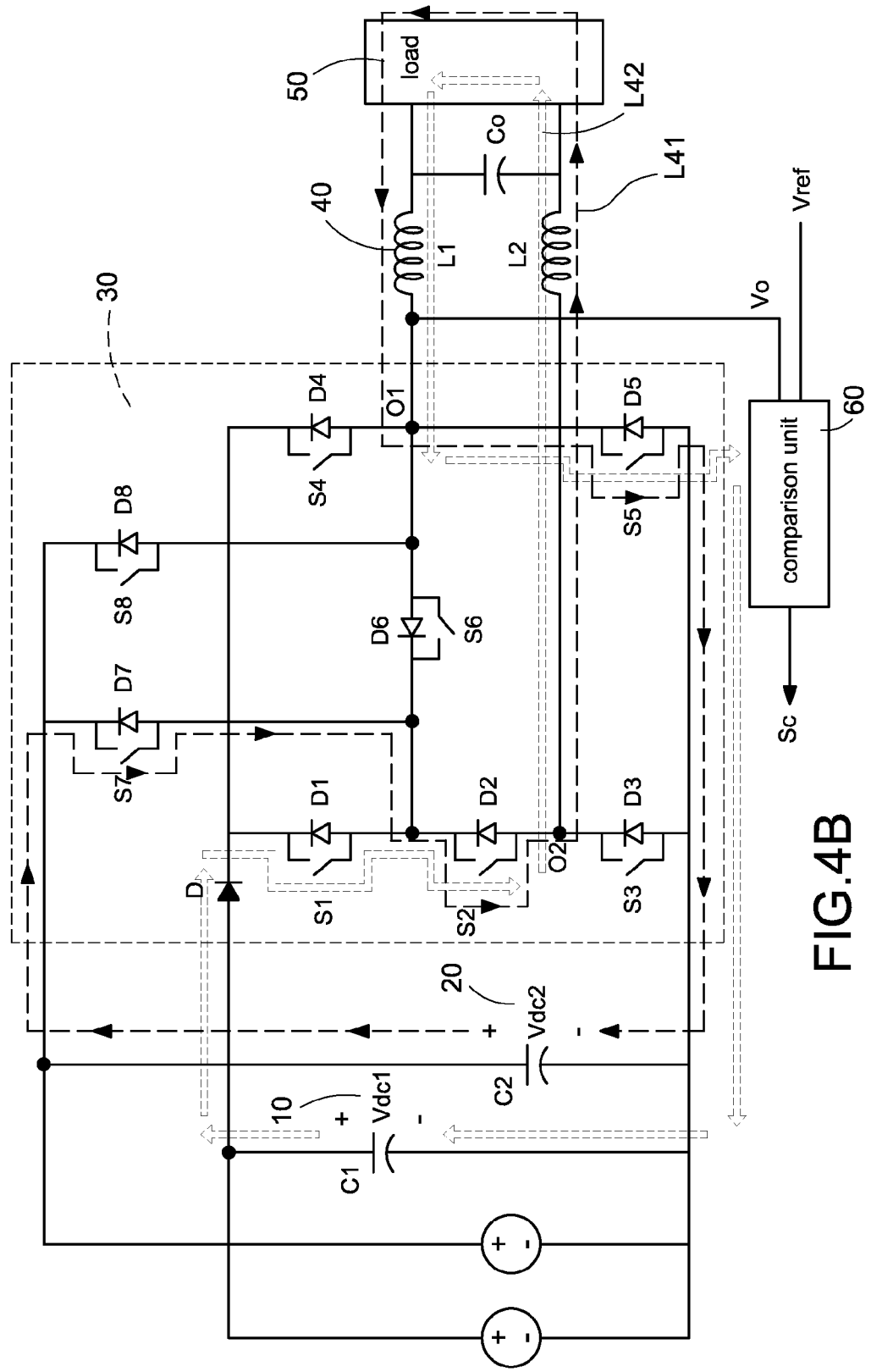
FIG. 4B is a circuit diagram of supplying power from the second DC input voltage of the hybrid DC-to-AC conversion system under a negative AC output voltage according to the first embodiment of the present disclosure.

Reference is made to FIG. 4B which is a circuit diagram of supplying power from the second DC input voltage of the hybrid DC-to-AC conversion system under a negative AC output voltage according to the first embodiment of the present disclosure. The second DC input voltage 20 is provided to supply the load 50 when the absolute value of the AC output voltage Vo is greater than the external reference voltage Vref and the first inductor L1 and the second inductor L2 of the filter 40 provide energy-storing operations. Correspondingly, a current loop L41 indicates that the energy-storing operation of the power conversion apparatus 30. On the other hand, the first inductor L1 and the second inductor L2 are provided to supply the load 50 by stored energy in the first inductor L1 and the second inductor L2 when the absolute value of the AC output voltage Vo is greater than the external reference voltage Vref and the first inductor L1 and the second inductor L2 of the filter 40 provide energy-releasing operations. Correspondingly, a current loop L42 indicates that the energy-releasing operation of the power conversion apparatus 30. Accordingly, the second DC input voltage 20 is provided to supply the load 50 through a current loop sequentially formed by the second DC input voltage 20, the seventh power switch S7, the second power switch S2, the second inductor L2, the load 50, the first inductor L1, the fifth power switch S5, and finally return to the second DC input voltage 20 (as the current loop L41 is shown) when the AC output voltage Vo is negative. In addition, the first inductor L1 and the second inductor L2 are provided to supply the load 50 by stored energy in the first inductor L1 and the second inductor L2 through a current loop sequentially formed by the first inductor L1, the fifth power switch S5, the diode D, the first power switch S1, the second power switch S2, the second inductor L2, the load 50, and finally return to the first inductor L1 (as the current loop L42 is shown) when the AC output voltage Vo is negative.

Note that, in this hybrid DC-to-AC conversion system, the first DC input voltage 10 can be stepped up to the second DC input voltage 20 by a boost converter 70 so that the first DC input voltage 10 and the boosted second DC input voltage 20 can achieve the same effect as the above embodiments.

Figure 5A:
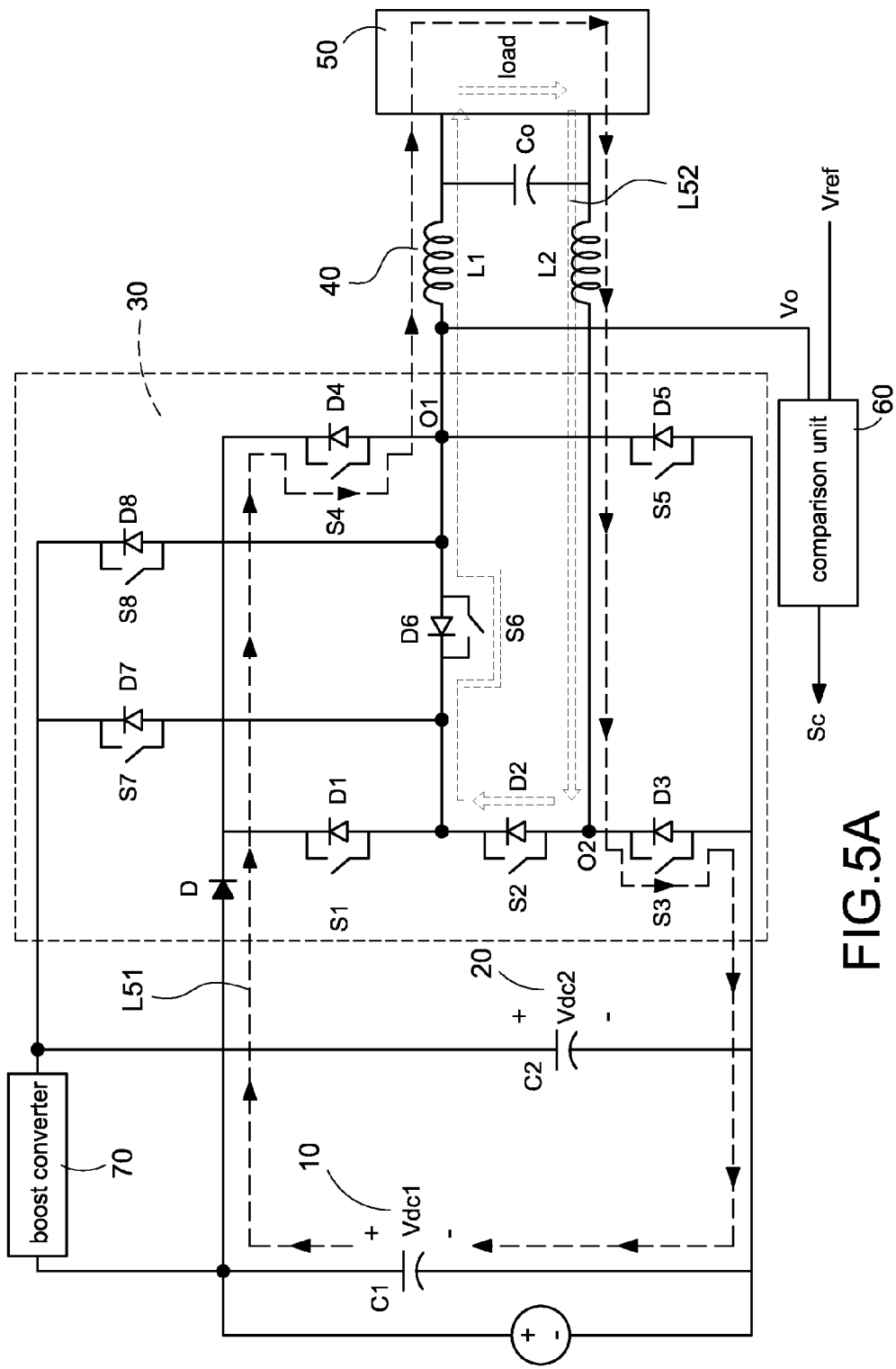
FIG. 5A is a circuit diagram of supplying power from the first DC input voltage of the hybrid DC-to-AC conversion system under a positive AC output voltage according to a second embodiment of the present disclosure.

Reference is made to FIG. 5A which is a circuit diagram of supplying power from the first DC input voltage of the hybrid DC-to-AC conversion system under a positive AC output voltage according to a second embodiment of the present disclosure. The major difference between the embodiment in FIG. 5A and the embodiment in the above-mentioned FIG. 3A is that the second DC input voltage 20 is obtained by stepping up the first DC input voltage 10 by the boost converter 70. The first DC input voltage 10 is provided to supply the load 50 when the absolute value of the AC output voltage Vo is less than or equal to the external reference voltage Vref and the first inductor L1 and the second inductor L2 of the filter 40 provide energy-storing operations. Correspondingly, a current loop L51 indicates that the energy-storing operation of the power conversion apparatus 30. On the other hand, the first inductor L1 and the second inductor L2 are provided to supply the load 50 by stored energy in the first inductor L1 and the second inductor L2 when the absolute value of the AC output voltage Vo is less than or equal to the external reference voltage Vref and the first inductor L1 and the second inductor L2 of the filter 40 provide energy-releasing operations. Correspondingly, a current loop L52 indicates that the energy-releasing operation of the power conversion apparatus 30. Accordingly, the first DC input voltage 10 is provided to supply the load 50 through a current loop sequentially formed by the first DC input voltage 10, the diode D, the fourth power switch S4, the first inductor L1, the load 50, the second inductor L2, the third power switch S3, and finally return to the first DC input voltage 10 (as the current loop L51 is shown) when the AC output voltage Vo is positive. In addition, the first inductor L1 and the second inductor L2 are provided to supply the load 50 by stored energy in the first inductor L1 and the second inductor L2 through a current loop sequentially formed by the first inductor L1, the load 50, the second inductor L2, the second diode D2, the sixth power switch S6, and finally return to the first inductor L1 (as the current loop L52 is shown) when the AC output voltage Vo is positive.

Figure 5B:
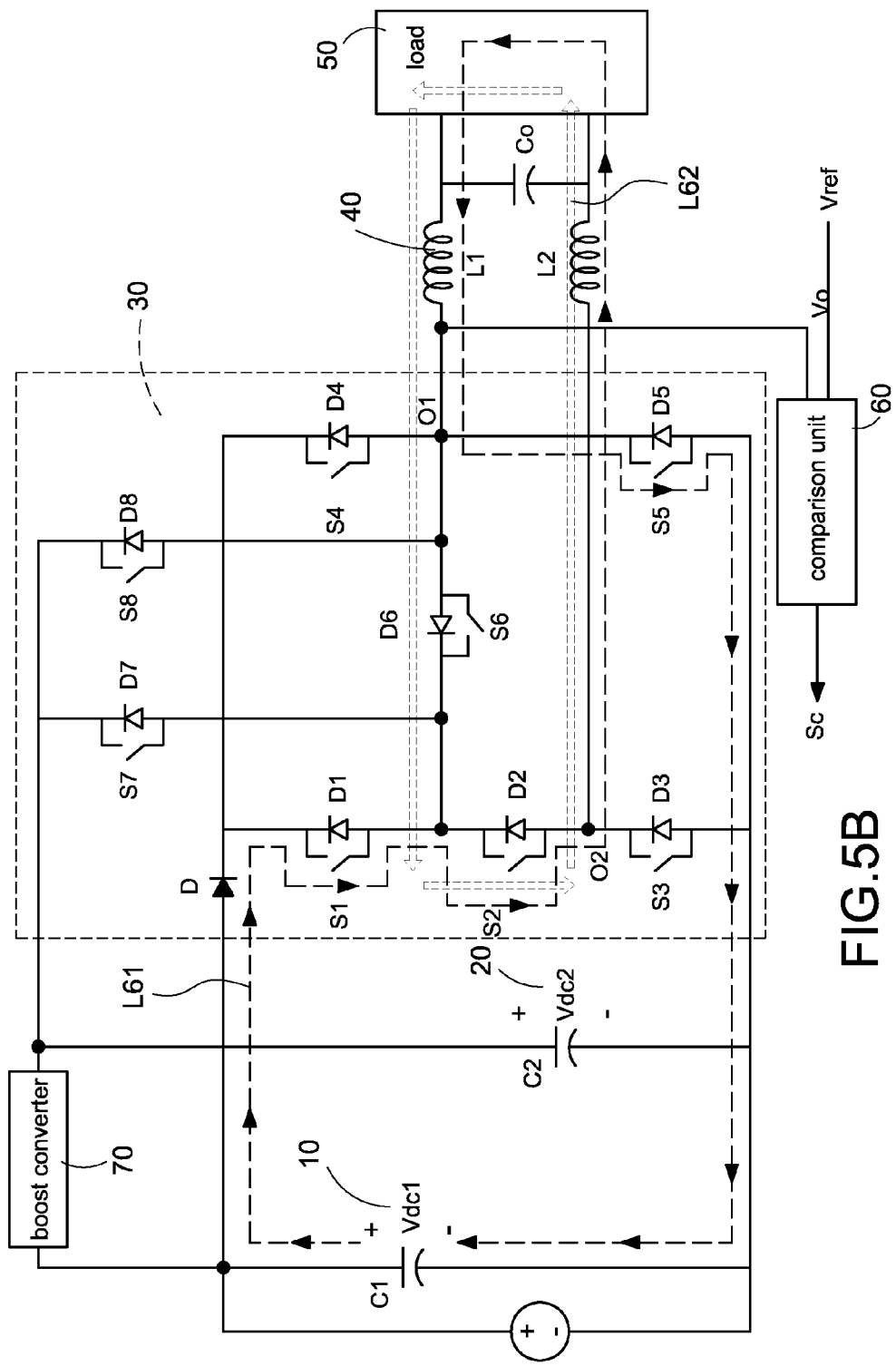
FIG. 5B is a circuit diagram of supplying power from the first DC input voltage of the hybrid DC-to-AC conversion system under a negative AC output voltage according to the second embodiment of the present disclosure.

Reference is made to FIG. 5B which is a circuit diagram of supplying power from the first DC input voltage of the hybrid DC-to-AC conversion system under a negative AC output voltage according to the second embodiment of the present disclosure. The major difference between the embodiment in FIG. 5B and the embodiment in the above-mentioned FIG. 3B is that the second DC input voltage 20 is obtained by stepping up the first DC input voltage 10 by the boost converter 70. The first DC input voltage 10 is provided to supply the load 50 when the absolute value of the AC output voltage Vo is less than or equal to the external reference voltage Vref and the first inductor L1 and the second inductor L2 of the filter 40 provide energy-storing operations. Correspondingly, a current loop L61 indicates that the energy-storing operation of the power conversion apparatus 30. On the other hand, the first inductor L1 and the second inductor L2 are provided to supply the load 50 by stored energy in the first inductor L1 and the second inductor L2 when the absolute value of the AC output voltage Vo is less than or equal to the external reference voltage Vref and the first inductor L1 and the second inductor L2 of the filter 40 provide energy-releasing operations. Correspondingly, a current loop L62 indicates that the energy-releasing operation of the power conversion apparatus 30. Accordingly, the first DC input voltage 10 is provided to supply the load 50 through a current loop sequentially formed by the first DC input voltage 10, the diode D, the first power switch S1, the second power switch S2, the second inductor L2, the load 50, the first inductor L1, the fifth power switch S5, and finally return to the first DC input voltage 10 (as the current loop L61 is shown) when the AC output voltage Vo is negative. In addition, the first inductor L1 and the second inductor L2 are provided to supply the load 50 by stored energy in the first inductor L1 and the second inductor L2 through a current loop sequentially formed by the first inductor L1, the sixth diode D6, the second power switch S2, the second inductor L2, the load 50, the finally return to the first inductor L1 (as the current loop L62 is shown) when the AC output voltage Vo is negative.

Figure 6A:
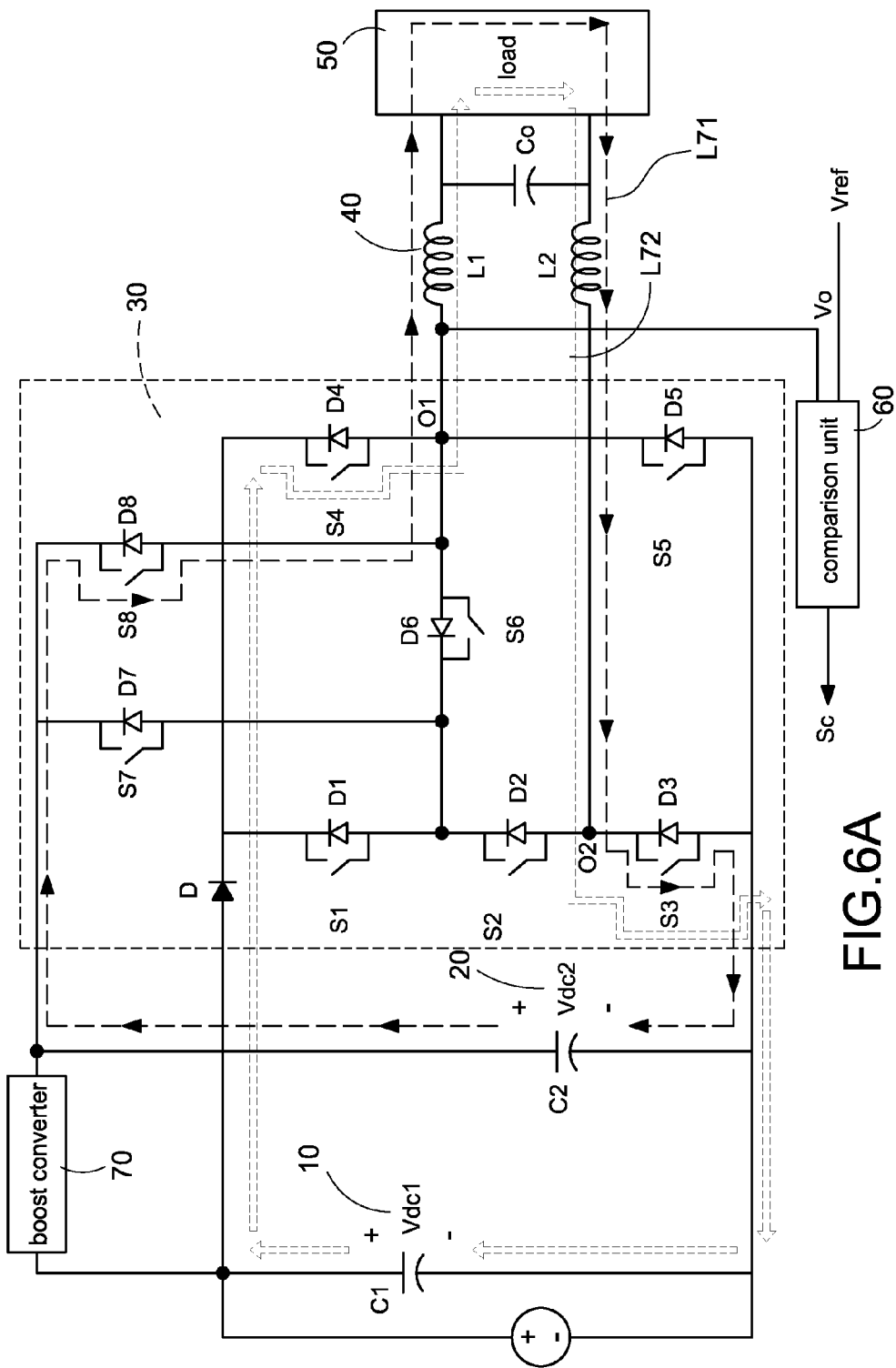
FIG. 6A is a circuit diagram of supplying power from the second DC input voltage of the hybrid DC-to-AC conversion system under a positive AC output voltage according to the second embodiment of the present disclosure.

Reference is made to FIG. 6A which is a circuit diagram of supplying power from the second DC input voltage of the hybrid DC-to-AC conversion system under a positive AC output voltage according to the second embodiment of the present disclosure. The major difference between the embodiment in FIG. 6A and the embodiment in the above-mentioned FIG. 4A is that the second DC input voltage 20 is obtained by stepping up the first DC input voltage 10 by the boost converter 70. The second DC input voltage 20 is provided to supply the load 50 when the absolute value of the AC output voltage Vo is greater than the external reference voltage Vref and the first inductor L1 and the second inductor L2 of the filter 40 provide energy-storing operations. Correspondingly, a current loop L71 indicates that the energy-storing operation of the power conversion apparatus 30. On the other hand, the first inductor L1 and the second inductor L2 are provided to supply the load 50 by stored energy in the first inductor L1 and the second inductor L2 when the absolute value of the AC output voltage Vo is greater than the external reference voltage Vref and the first inductor L1 and the second inductor L2 of the filter 40 provide energy-releasing operations. Correspondingly, a current loop L72 indicates that the energy-releasing operation of the power conversion apparatus 30. Accordingly, the second DC input voltage 20 is provided to supply the load 50 through a current loop sequentially formed by the second DC input voltage 20, the eighth power switch S8, the first inductor L1, the load 50, the second inductor L2, the third power switch S3, and finally return to the second DC input voltage 20 (as the current loop L71 is shown) when the AC output voltage Vo is positive. In addition, the first inductor L1 and the second inductor L2 are provided to supply the load 50 by stored energy in the first inductor L1 and the second inductor L2 through a current loop sequentially formed by the first inductor L1, the load 50, the second inductor L2, the third power switch S3, the diode D, the fourth power switch S4, and finally return to the first inductor L1 (as the current loop L72 is shown) when the AC output voltage Vo is positive.

Figure 6B:
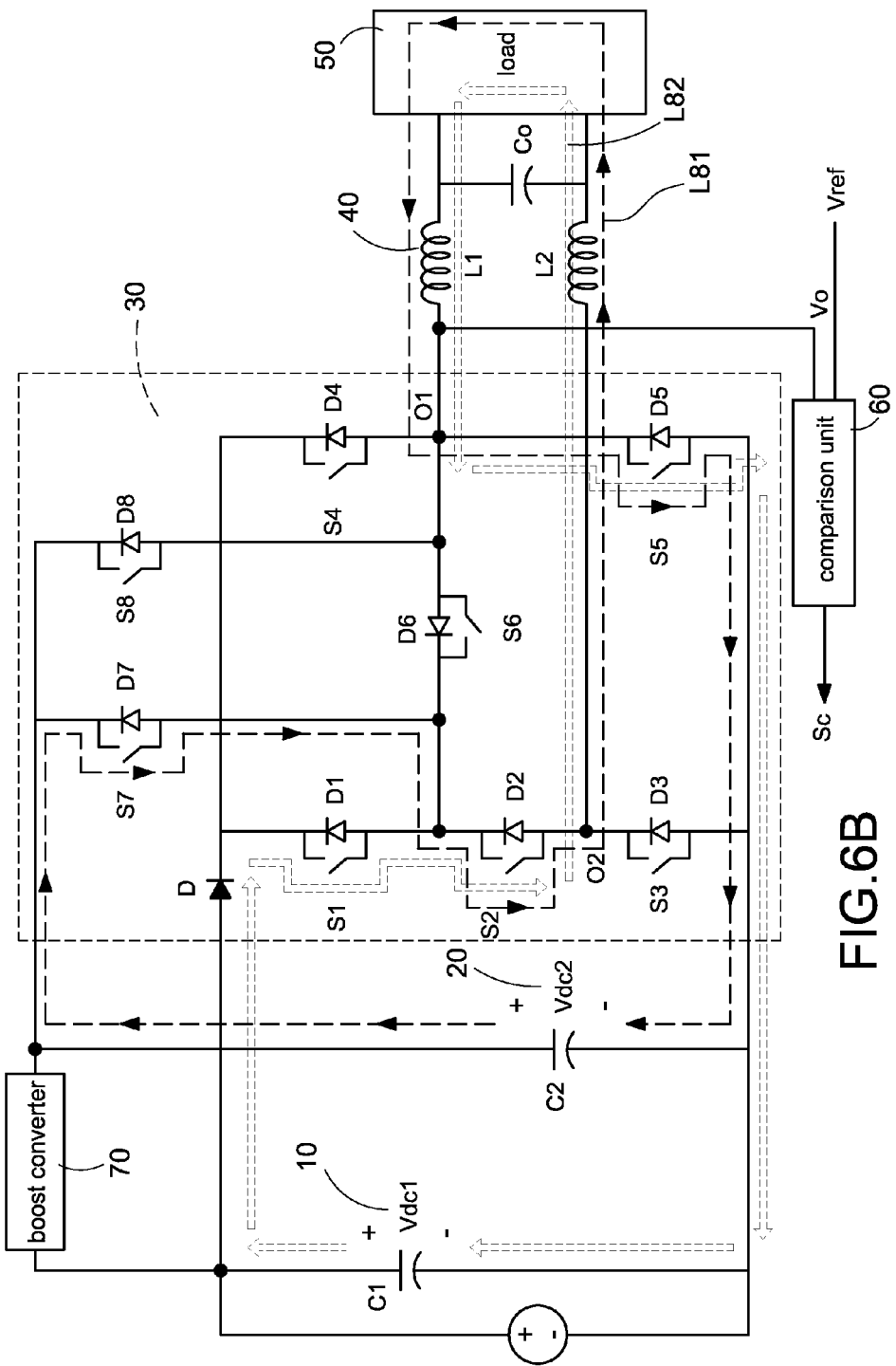
FIG. 6B is a circuit diagram of supplying power from the second DC input voltage of the hybrid DC-to-AC conversion system under a negative AC output voltage according to the second embodiment of the present disclosure.

Reference is made to FIG. 6B which is a circuit diagram of supplying power from the second DC input voltage of the hybrid DC-to-AC conversion system under a negative AC output voltage according to the second embodiment of the present disclosure. The major difference between the embodiment in FIG. 6B and the embodiment in the above-mentioned FIG. 4B is that the second DC input voltage 20 is obtained by stepping up the first DC input voltage 10 by the boost converter 70. The second DC input voltage 20 is provided to supply the load 50 when the absolute value of the AC output voltage Vo is greater than the external reference voltage Vref and the first inductor L1 and the second inductor L2 of the filter 40 provide energy-storing operations. Correspondingly, a current loop L81 indicates that the energy-storing operation of the power conversion apparatus 30. On the other hand, the first inductor L1 and the second inductor L2 are provided to supply the load 50 by stored energy in the first inductor L1 and the second inductor L2 when the absolute value of the AC output voltage Vo is greater than the external reference voltage Vref and the first inductor L1 and the second inductor L2 of the filter 40 provide energy-releasing operations. Correspondingly, a current loop L82 indicates that the energy-releasing operation of the power conversion apparatus 30. Accordingly, the second DC input voltage 20 is provided to supply the load 50 through a current loop sequentially formed by the second DC input voltage 20, the seventh power switch S7, the second power switch S2, the second inductor L2, the load 50, the first inductor L1, the fifth power switch S5, and finally return to the second DC input voltage 20 (as the current loop L81 is shown) when the AC output voltage Vo is negative. In addition, the first inductor L1 and the second inductor L2 are provided to supply the load 50 by stored energy in the first inductor L1 and the second inductor L2 through a current loop sequentially formed by the first inductor L1, the fifth power switch S5, the diode D, the first power switch S1, the second power switch S2, the second inductor L2, the load 50, and finally return to the first inductor L1 (as the current loop L82 is shown) when the AC output voltage Vo is negative.

Figure 7:
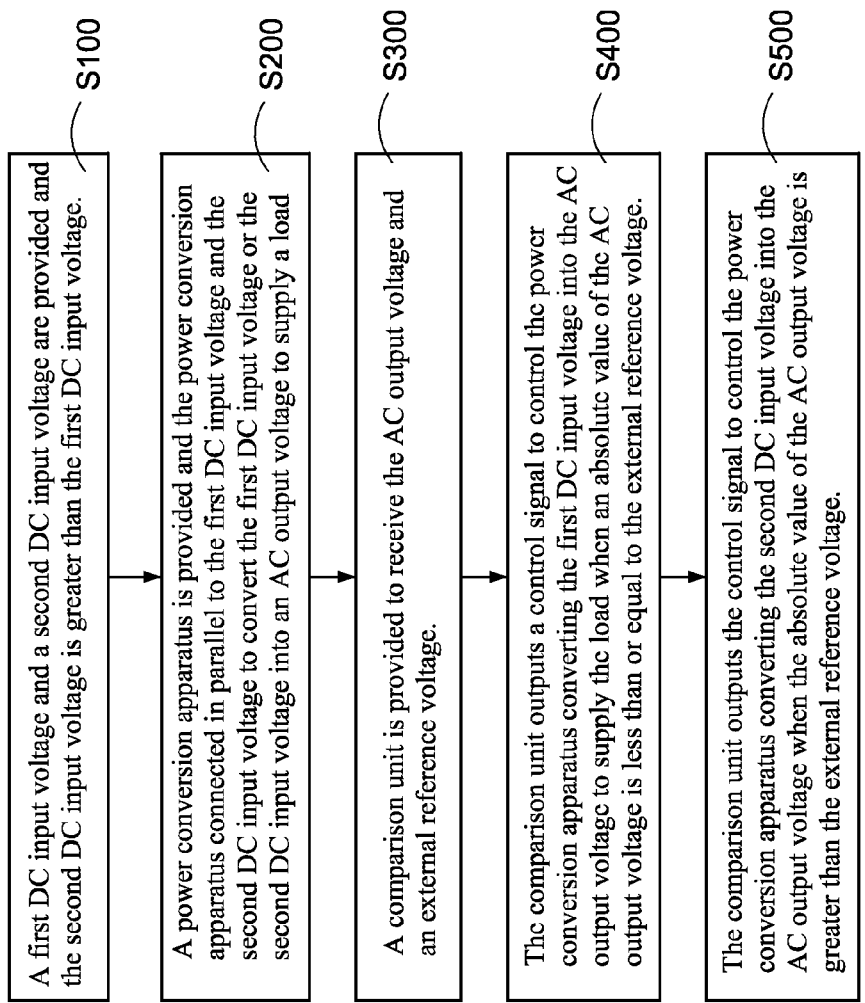
FIG. 7 is a flowchart of a method of operating a hybrid DC-to-AC conversion system according to the present disclosure.

Reference is made to FIG. 7 which is a flowchart of a method of operating a hybrid DC-to-AC conversion system according to the present disclosure. The method includes the following steps: A first DC input voltage and a second DC input voltage are provided and the second DC input voltage is greater than the first DC input voltage (S100).

A power conversion apparatus is provided and the power conversion apparatus connected in parallel to the first DC input voltage and the second DC input voltage to convert the first DC input voltage or the second DC input voltage into an AC output voltage to supply a load (S200). The power conversion apparatus includes has a first power switch and a first diode connected in parallel to the first power switch, a second power switch and a second diode connected in parallel to the second power switch, a third power switch and a third diode connected in parallel to the third power switch, a fourth power switch and a fourth diode connected in parallel to the fourth power switch, a fifth power switch and a fifth diode connected in parallel to the fifth power switch, a sixth power switch and a sixth diode connected in parallel to the sixth power switch, a seventh power switch and a seventh diode connected in parallel to the seventh power switch, an eighth power switch and an eighth diode connected in parallel to the eighth power switch, and a diode.

The third power switch is connected in series to the second power switch and the second power switch is connected in series to the first power switch to form a first path. Also, a second output terminal is formed at a common node of the second power switch and the third power switch. The fifth power switch is connected in series to the fourth power switch. An anode of the fifth diode is connected to an anode of the third diode and then is connected to a negative terminal of the first DC input voltage and a negative terminal of the second DC input voltage. The sixth power switch is connected between an anode of the first diode and an anode of the fourth diode. A first output terminal is formed at a common node of the sixth power switch and the fourth power switch. In particular, an AC output voltage is outputted from the first output terminal and the second output terminal. An anode of the seventh diode is connected to a cathode of the sixth diode. The seventh power switch is connected in series to the second power switch and the second power switch is connected in series to the third power switch to form a second path. Also, the second path is connected in parallel to the second DC input voltage. An anode of the eighth diode is connected to an anode of the sixth diode. A cathode of the eighth diode is connected to a cathode of the seventh diode and then is connected to a positive terminal of the second DC input voltage. A cathode of the diode is connected to a cathode of the first diode and a cathode of the fourth diode and an anode of the diode is connected to a positive terminal of the first DC input voltage. The first path is connected in parallel to the first DC input voltage via the diode. The power conversion apparatus is provided to convert the first DC input voltage and the second DC input voltage to supply a rear-end load. In addition, the hybrid DC-to-AC conversion system further includes a filter. The filter is connected between the first output terminal, the second output terminal, and the load. In particular, the filter has a first inductor, a second inductor, and a capacitor.

Note that, in this hybrid DC-to-AC conversion system, the first DC input voltage can be stepped up to the second DC input voltage by a boost converter so that the first DC input voltage and the boosted second DC input voltage can achieve the same effect as the above embodiments.

A comparison unit is provided to receive the AC output voltage and an external reference voltage (S300). The comparison unit outputs a control signal to control the power conversion apparatus converting the first DC input voltage into the AC output voltage to supply the load when an absolute value of the AC output voltage is less than or equal to the external reference voltage (S400). The comparison unit outputs the control signal to control the power conversion apparatus converting the second DC input voltage into the AC output voltage when the absolute value of the AC output voltage is greater than the external reference voltage (S500). Accordingly, after comparing the AC output voltage to the external reference voltage, the smaller-level first DC input voltage is provided to drive the power switches of the power conversion apparatus, thus reducing switching losses generated from the power switches when the required power of supplying the load is smaller, whereas the greater-level second DC input voltage is provided to drive the power switches of the power conversion apparatus when the required power of supplying the load is greater. That is, the first DC input voltage and the second input voltage are determined to drive the power switches depending on the required power of supplying the load, thus significantly increasing the conversion efficiency.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A hybrid DC-to-AC conversion system comprising:
    a first DC input voltage;
    a second DC input voltage, wherein the second DC input voltage is greater than the first DC input voltage;
    a power conversion apparatus having a first power switch, a second power switch, a third power switch and a fourth power switch; wherein the first power switch, the second power switch and the third power switch are connected in series to form a first path, and the first path is connected in parallel to the first DC input voltage; the fourth power switch, the second power switch and the third power switch are connected in series to form a second path, and the second path is connected in parallel to the second DC input voltage and configured to convert the first DC input voltage or the second DC input voltage into an AC output voltage to supply a load; and
    a comparison unit configured to receive the AC output voltage and an external reference voltage, wherein the comparison unit is configured to output a control signal to control the power conversion apparatus converting the first DC input voltage into the AC output voltage when an absolute value of the AC output voltage is less than or equal to the external reference voltage; whereas the comparison unit is configured to output the control signal to control the power conversion apparatus converting the second DC input voltage into the AC output voltage when the absolute value of the AC output voltage is greater than the external reference voltage.

2. The hybrid DC-to-AC conversion system in claim 1, wherein the power conversion apparatus further comprising:
    a first diode connected in parallel to the first power switch;
    a second diode connected in parallel to the second power switch;
    a third diode connected in parallel to the third power switch, and a second output terminal formed at a common node of the second power switch and the third power switch;
    a fifth power switch and a fourth diode connected in parallel to the fifth power switch;
    a sixth power switch and a fifth diode connected in parallel to the sixth power switch, the sixth power switch connected in series to the fifth power switch, an anode of the fifth diode connected to an anode of the third diode and then connected to a negative terminal of the first DC input voltage and a negative terminal of the second DC input voltage;
    a seventh power switch and a sixth diode connected in parallel to the seventh power switch, the seventh power switch connected between an anode of the first diode and an anode of the fourth diode, a first output terminal formed at a common node of the seventh power switch and the fifth power switch, wherein the AC output voltage is outputted from the first output terminal and the second output terminal;
    a seventh diode connected in parallel to the fourth power switch, an anode of the seventh diode connected to a cathode of the sixth diode;
    an eighth power switch and an eighth diode connected in parallel to the eighth power switch, an anode of the eighth diode connected to an anode of the sixth diode, a cathode of the eighth diode connected to a cathode of the seventh diode and then connected to a positive terminal of the second DC input voltage; and
    a diode, a cathode of the diode connected to a cathode of the first diode and a cathode of the fourth diode, an anode of the diode connected to a positive terminal of the first DC input voltage, the first path connected in parallel to the first DC input voltage via the diode.

3. The hybrid DC-to-AC conversion system in claim 2, further comprising:
    a filter connected between the first output terminal, the second output terminal, and the load, the filter having a first inductor, a second inductor, and a capacitor.

4. The hybrid DC-to-AC conversion system in claim 2, wherein the first DC input voltage is stepped up to the second DC input voltage by a boost converter; wherein the positive terminal and the negative terminal of the first DC input voltage are respectively connected to two terminals of a first DC capacitor to maintain a magnitude of the first DC input voltage, the positive terminal and the negative terminal of the second DC input voltage are respectively connected to two terminals of a second DC capacitor to maintain a magnitude of the second DC input voltage.

5. The hybrid DC-to-AC conversion system in claim 3, wherein the first DC input voltage is configured to supply the load when the absolute value of the AC output voltage is less than or equal to the external reference voltage and the first inductor and the second inductor of the filter are configured to provide energy-storing operations.

6. The hybrid DC-to-AC conversion system in claim 3, wherein the first inductor and the second inductor are configured to supply the load by stored energy in the first inductor and the second inductor when the absolute value of the AC output voltage is less than or equal to the external reference voltage and the first inductor and the second inductor of the filter are configured to provide energy-releasing operations.

7. The hybrid DC-to-AC conversion system in claim 3, wherein the second DC input voltage is configured to supply the load when the absolute value of the AC output voltage is greater than the external reference voltage and the first inductor and the second inductor of the filter are configured to provide energy-storing operations.

8. The hybrid DC-to-AC conversion system in claim 3, wherein the first inductor and the second inductor are configured to supply the load by stored energy in the first inductor and the second inductor when the absolute value of the AC output voltage is greater than the external reference voltage and the first inductor and the second inductor of the filter are configured to provide energy-releasing operations.

9. The hybrid DC-to-AC conversion system in claim 5, wherein the first DC input voltage is configured to supply the load through a current loop sequentially formed by the first DC input voltage, the diode, the fifth power switch, the first inductor, the load, the second inductor, and the third power switch when the AC output voltage is positive; the first DC input voltage is configured to supply the load through a current loop sequentially formed by the first DC input voltage, the diode, the first power switch, the second power switch, the second inductor, the load, the first inductor, and the sixth power switch when the AC output voltage is negative.

10. The hybrid DC-to-AC conversion system in claim 6, wherein the first inductor and the second inductor are configured to supply the load by stored energy in the first inductor and the second inductor through a current loop sequentially formed by the first inductor, the load, the second inductor, the second diode, and the seventh power switch when the AC output voltage is positive; the first inductor and the second inductor are configured to supply the load by stored energy in the first inductor and the second inductor through a current loop sequentially formed by the first inductor, the sixth diode, the second power switch, the second inductor, and the load when the AC output voltage is negative.

11. The hybrid DC-to-AC conversion system in claim 7, wherein the second DC input voltage is configured to supply the load through a current loop sequentially formed by the second DC input voltage, the eighth power switch, the first inductor, the load, the second inductor, and the third power switch when the AC output voltage is positive; the second DC input voltage is configured to supply the load through a current loop sequentially formed by the second DC input voltage, the fourth power switch, the second power switch, the second inductor, the load, the first inductor, and the sixth power switch when the AC output voltage is negative.

12. The hybrid DC-to-AC conversion system in claim 8, wherein the first inductor and the second inductor are configured to supply the load by stored energy in the first inductor and the second inductor through a current loop sequentially formed by the first inductor, the load, the second inductor, the third power switch, the diode, and the fifth power switch when the AC output voltage is positive; the first inductor and the second inductor are configured to supply the load by stored energy in the first inductor and the second inductor through a current loop sequentially formed by the first inductor, the sixth power switch, the diode, the first power switch, the second power switch, the second inductor, and the load when the AC output voltage is negative.

13. A method of operating a hybrid DC-to-AC conversion system; steps of the method comprising:
 (a) providing a first DC input voltage and a second DC input voltage, wherein the second DC input voltage is greater than the first DC input voltage;
 (b) providing a power conversion apparatus, wherein the power conversion apparatus has a first power switch, a second power switch, a third power switch and a fourth power switch; the first power switch, the second power switch and the third power switch are connected in series to form a first path, and the first path is connected in parallel to the first DC input voltage; the fourth power switch, the second power switch and the third power switch are connected in series to form a second path, and the second path is connected in parallel to the second DC input voltage and is configured to convert the first DC input voltage or the second DC input voltage into an AC output voltage to supply a load;
 (c) providing a comparison unit, wherein the comparison unit is configured to receive the AC output voltage and an external reference voltage;
 (d) outputting a control signal by the comparison unit to control the power conversion apparatus converting the first DC input voltage into the AC output voltage when an absolute value of the AC output voltage is less than or equal to the external reference voltage; and
 (e) outputting the control signal by the comparison unit to control the power conversion apparatus converting the second DC input voltage into the AC output voltage when the absolute value of the AC output voltage is greater than the external reference voltage.

14. The method of operating the hybrid DC-to-AC conversion system in claim 13, wherein the power conversion apparatus further comprising:
 a first diode connected in parallel to the first power switch;
 a second diode connected in parallel to the second power switch;
 a third diode connected in parallel to the third power switch, and a second output terminal formed at a common node of the second power switch and the third power switch;
 a fifth power switch and a fourth diode connected in parallel to the fifth power switch;
 a sixth power switch and a fifth diode connected in parallel to the sixth power switch, the sixth power switch connected in series to the fifth power switch, an anode of the fifth diode connected to an anode of the third diode and then connected to a negative terminal of the first DC input voltage and a negative terminal of the second DC input voltage;
 a seventh power switch and a sixth diode connected in parallel to the seventh power switch, the seventh power switch connected between an anode of the first diode and an anode of the fourth diode, a first output terminal formed at a common node of the seventh power switch and the fifth power switch, wherein the AC output voltage is outputted from the first output terminal and the second output terminal;
 a seventh diode connected in parallel to the fourth power switch, an anode of the seventh diode connected to a cathode of the sixth diode;
 an eighth power switch and an eighth diode connected in parallel to the eighth power switch, an anode of the eighth diode connected to an anode of the sixth diode, a cathode of the eighth diode connected to a cathode of the seventh diode and then connected to a positive terminal of the second DC input voltage; and
 a diode, a cathode of the diode connected to a cathode of the first diode and a cathode of the fourth diode, an anode of the diode connected to a positive terminal of the first DC input voltage, the first path connected in parallel to the first DC input voltage via the diode.

15. The method of operating the hybrid DC-to-AC conversion system in claim 14, wherein the hybrid DC-to-AC conversion system further comprising:
 a filter connected between the first output terminal, the second output terminal, and the load, the filter having a first inductor, a second inductor, and a capacitor.

16. The method of operating the hybrid DC-to-AC conversion system in claim 14, wherein the first DC input voltage is stepped up to the second DC input voltage by a boost converter; wherein the positive terminal and the negative terminal of the first DC input voltage are respectively connected to two terminals of a first DC capacitor to maintain a magnitude of the first DC input voltage, the positive terminal and the negative terminal of the second DC input voltage are respectively connected to two terminals of a second DC capacitor to maintain a magnitude of the second DC input voltage.

17. The method of operating the hybrid DC-to-AC conversion system in claim 15, wherein the first DC input voltage is configured to supply the load when the absolute value of the AC output voltage is less than or equal to the external reference voltage and the first inductor and the second inductor of the filter are configured to provide energy-storing operations: the first DC input voltage is configured to supply the load through a current loop sequentially formed by the first DC input voltage, the diode, the fifth power switch, the first inductor, the load, the second inductor, and the third power switch when the AC output voltage is positive; the first DC input voltage is configured to supply the load through a current loop sequentially formed by the first DC input voltage, the diode, the first power switch, the second power switch, the second inductor, the load, the first inductor, and the sixth power switch when the AC output voltage is negative.

18. The method of operating the hybrid DC-to-AC conversion system in claim 15, wherein the first inductor and the second inductor are configured to supply the load by stored energy in the first inductor and the second inductor when the absolute value of the AC output voltage is less than or equal to the external reference voltage and the first inductor and the second inductor of the filter are configured to provide energy-releasing operations: the first inductor and the second inductor are configured to supply the load by stored energy in the first inductor and the second inductor through a current loop sequentially formed by the first inductor, the load, the second inductor, the second diode, and the seventh power switch when the AC output voltage is positive; the first inductor and the second inductor are configured to supply the load by stored energy in the first inductor and the second inductor through a current loop sequentially formed by the first inductor, the sixth diode, the second power switch, the second inductor, and the load when the AC output voltage is negative.

19. The method of operating the hybrid DC-to-AC conversion system in claim 15, wherein the second DC input voltage is configured to supply the load when the absolute value of the AC output voltage is greater than the external reference voltage and the first inductor and the second inductor of the filter are configured to provide energy-storing operations: the second DC input voltage is configured to supply the load through a current loop sequentially formed by the second DC input voltage, the eighth power switch, the first inductor, the load, the second inductor, and the third power switch when the AC output voltage is positive; the second DC input voltage is configured to supply the load through a current loop sequentially formed by the second DC input voltage, the fourth power switch, the second power switch, the second inductor, the load, the first inductor, and the sixth power switch when the AC output voltage is negative.

20. The method of operating the hybrid DC-to-AC conversion system in claim 15, wherein the first inductor and the second inductor are configured to supply the load by stored energy in the first inductor and the second inductor when the absolute value of the AC output voltage is greater than the external reference voltage and the first inductor and the second inductor of the filter are configured to provide energy-releasing operations:
   the first inductor and the second inductor are configured to supply the load by stored energy in the first inductor and the second inductor through a current loop sequentially formed by the first inductor, the load, the second inductor, the third power switch, the diode, and the fifth power switch when the AC output voltage is positive;
   the first inductor and the second inductor are configured to supply the load by stored energy in the first inductor and the second inductor through a current loop sequentially formed by the first inductor, the sixth power switch, the diode, the first power switch, the second power switch, the second inductor, and the load when the AC output voltage is negative.

* * * * *